United States Patent [19]

Celada et al.

[11] 3,779,741
[45] Dec. 18, 1973

[54] METHOD FOR REDUCING PARTICULATE METAL ORES TO SPONGE IRON WITH RECYCLED REDUCING GAS

[75] Inventors: Juan Celada; Patrick W. MacKay; Ramon de la Pena, all of Monterrey, N. L., Mexico

[73] Assignee: Fierro Esponja, S.A., Monterrey, N. L., Mexico

[22] Filed: Oct. 15, 1971

[21] Appl. No.: 189,560

[52] U.S. Cl. .................................................. 75/35
[51] Int. Cl. ............................................. C21b 13/02
[58] Field of Search ................................ 75/35, 41

[56] References Cited
UNITED STATES PATENTS

| | | | |
|---|---|---|---|
| 2,793,946 | 5/1957 | Paschal | 75/41 |
| 2,048,112 | 7/1936 | Gahl | 75/35 X |
| 3,375,098 | 3/1968 | Marshall | 75/35 |
| 3,375,099 | 3/1968 | Marshall | 75/35 |
| 3,475,160 | 10/1969 | Heinzelmann et al. | 75/35 X |

Primary Examiner—L. Dewayne Rutledge
Assistant Examiner—M. J. Andrews
Attorney—A. Thomas Safford et al.

[57] ABSTRACT

A method and apparatus is disclosed for achieving improved reduction efficiency in the reduction of particulate metal ores, e.g., iron ore, in a vertical shaft, moving bed reactor having a reduction zone in which a hot reducing gas is caused to flow through a portion of the ore bed to reduce the metal ore thereof to metal, e.g., sponge iron. The improved efficiency is achieved by using a splitflow of reducing gas to the reduction zone of the reactor. In one embodiment of the invention separate reducing gas streams are supplied to the top and bottom of the reduction zone and combined near the center of the reduction zone and removed from the reactor. In another embodiment of the invention reducing gas is fed to a point near the center of the reduction zone, caused to flow both upwardly and downwardly through the ore in the reduction zone and removed at points near the top and bottom of the reduction zone. By using the disclosed split-flow systems, the residence time of the metal-bearing material within the reactor can be reduced and the productivity of the reactor thereby increased.

11 Claims, 2 Drawing Figures

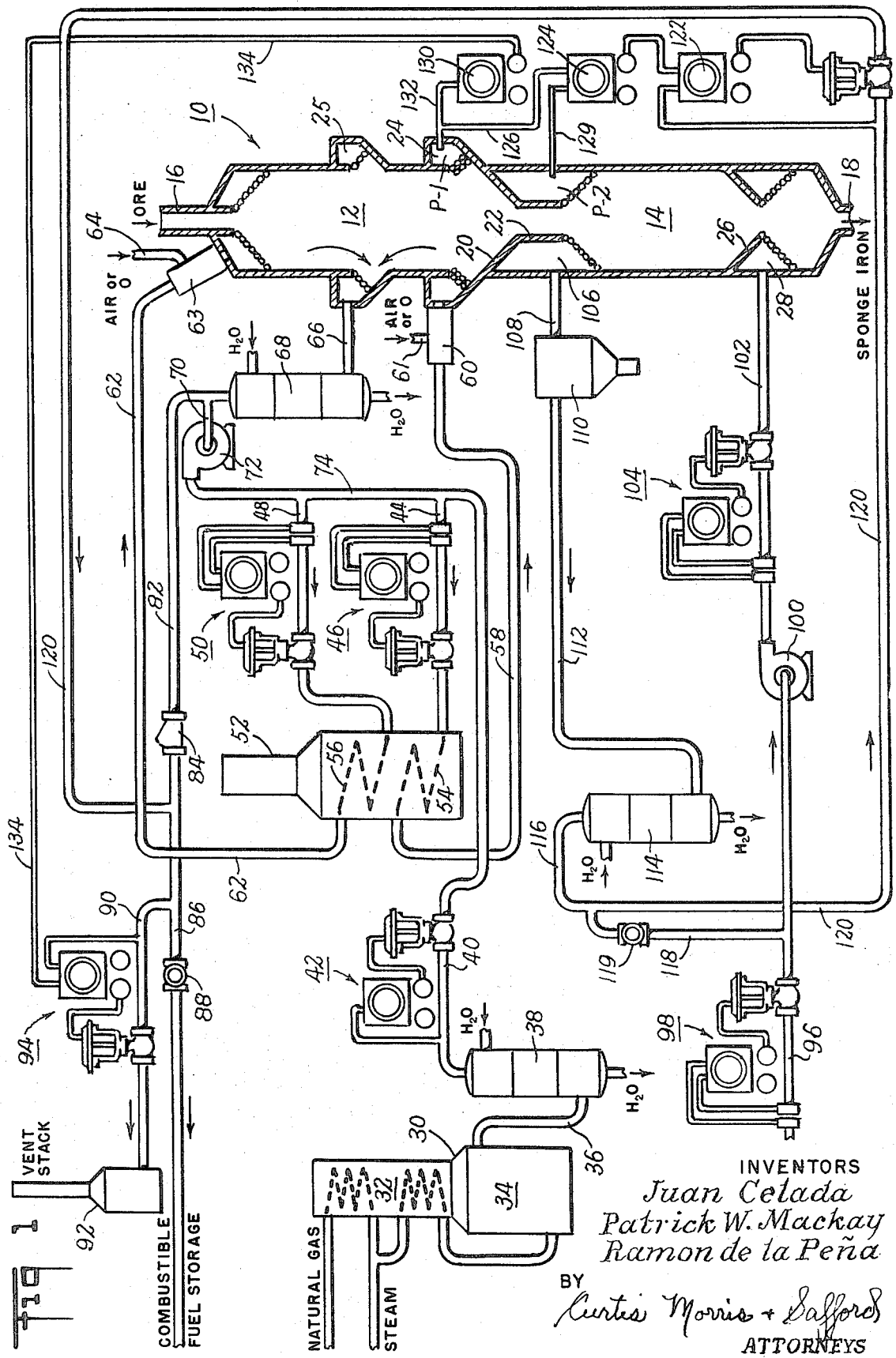

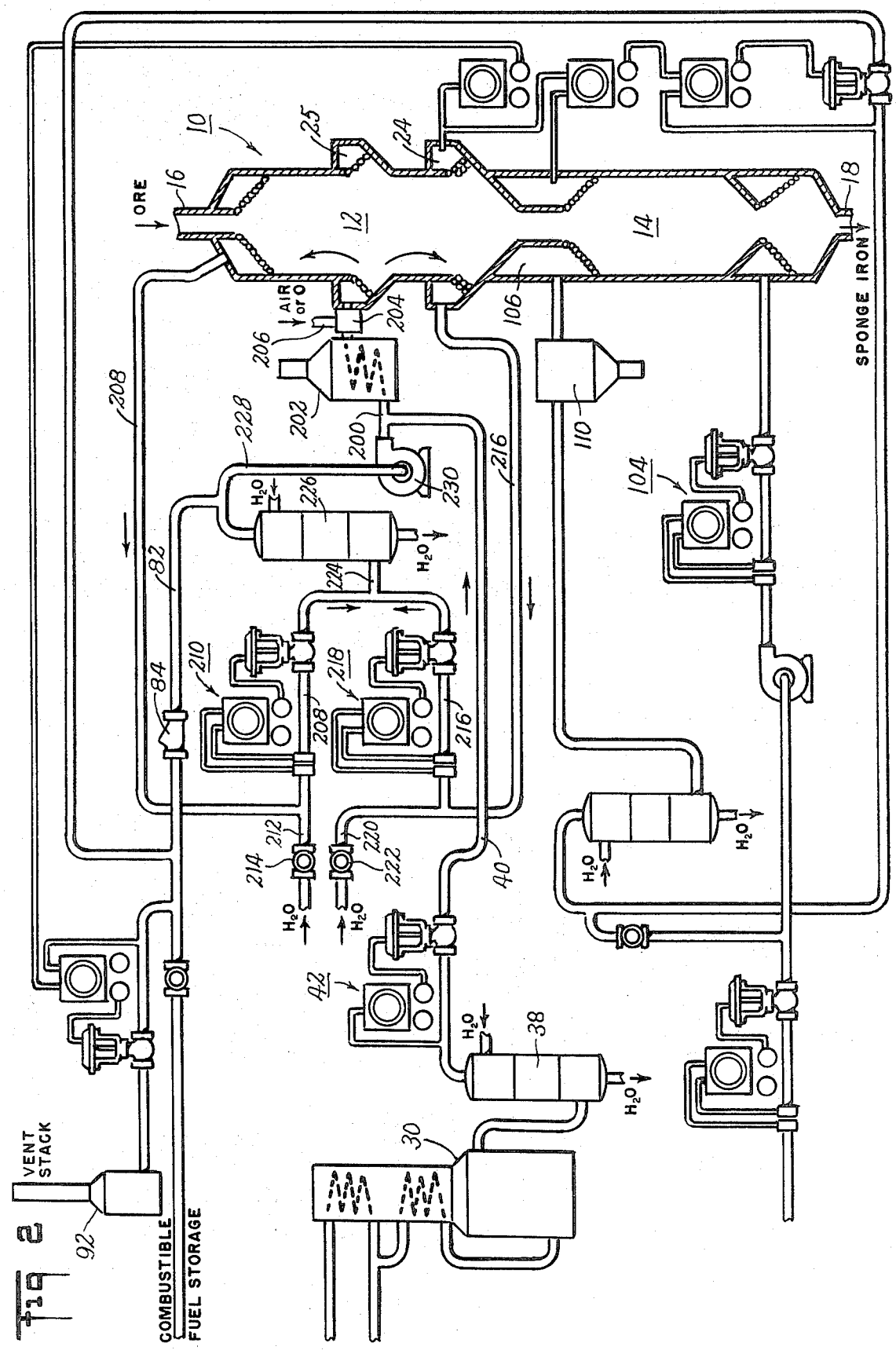

METHOD FOR REDUCING PARTICULATE METAL ORES TO SPONGE IRON WITH RECYCLED REDUCING GAS

This invention relates to the gaseous reduction of particulate ores to metals in particulate form in a moving bed, vertical shaft reactor, and more particularly, to a method and apparatus for improving the efficiency of the reduction of the ore in such a reactor. In the following description the method and apparatus are illustratively described as applied to the reduction of iron ore to sponge iron. However, as the description proceeds, it will be evident to those skilled in the art that the invention is also applicable to the treatment of ores other then iron ore.

In general, the production of sponge iron in a vertical shaft, moving bed reactor ordinarily involves two principal steps, namely, reduction of the ore in a reduction zone of the reactor with a suitable not reducing gas and subsequent cooling of the resulting sponge iron with a gaseous coolant in a cooling zone of the reactor. The reducing gas is typically a gas largely composed of carbon monoxide and hydrogen made, for example, by the catalytic reforming of a mixture of natural gas and steam or by a water gas reaction or in other known manner. The reducing gas is brought into contact with the iron ore in the reduction zone of the reactor at a temperature of the order of 850° to 1,100°C., preferably 900° to 1,000°C. The reducing gas may be introduced into the reactor at the bottom of reduction zone and caused to flow counter-currently to the downwardly moving ore bed, or alternatively, the reducing gas may be introduced at the top of the reducing zone and caused to flow co-currently with the downwardly moving ore bed.

As conducive to a clearer understanding of the present invention, it may be pointed out that the overall reduction rate achieved in such a reactor depends primarily upon two factors, namely, (a) the chemical reaction rate between the reducing constituents of the gas and the oxygen of the ore and (b) the rate at which the reducing gas diffuses into the interior of the ore particles. The chemical reaction rate is strongly temperature-dependent, whereas the gas diffusion rate into the ore particles is essentially independent of temperature and depends importantly upon the concentration of hydrogen in the reducing gas. In the early stages of the reduction process, that is, when the extent of reduction of the ore is between say 0 percent and about 60 percent, the chemical reaction rate is the dominant factor in determining the overall reduction rate, whereas in the later stages of the reduction process, i.e., between say 60 percent and 95 percent reduction, the gas diffusion rate is the dominant factor in determining the overall reduction rate.

In cases where counter-current flow of the reducing gas and ore is used, the fresh gas containing a high proportion of hydrogen initially comes into contact with largely reduced ore. Thus the rate of diffusion of gas into the ore particles is relatively high. In other words, the conditions in the lower portion of the reduction zone tend to favor a relatively high overall reduction rate. As the gas moves upwardly into the upper portion of the reduction zone, both its temperature and content of reducing constituents decrease. As pointed out above, when the percentage of reduction is less than 60 percent, the chemical reaction rate becomes a dominant factor and this reaction rate is adversely affected by both the relatively low temperature of the gas and its low concentration of reducing constituents. Thus the conditions in the upper portion of the reduction zone are unfavorable from the standpoint of achieving a high overall reduction rate.

In cases where co-current flow of the reducing gas and ore is used, the high temperature and concentration of reducing constituents in the gas entering the upper portion of the reduction zone tend to maximize the chemical reaction rate. Thus the conditions in the upper portion of the reduction zone are favorable from the standpoint of achieving a high overall reduction rate. However, in the lower portion of the reduction zone, the gas is substantially depleted in respect to its hydrogen content and thus diffuses relatively slowly into the interior of the largely reduced sponge iron particles. Since this diffusion rate is the dominant factor in the overall reduction rate in the case of largely reduced particles, the conditions in the lower portion of the reduction zone are unfavorable from the standpoint of achieving a high overall reduction rate.

It is accordingly an object of the present invention to provide a method and apparatus for the gaseous reduction of metal ores in a vertical shaft, moving bed reactor which combines the advantage of counter-current and co-current flow of the gas and ore while minimizing the disadvantages thereof. It is another object of the invention to provide such a method and apparatus which reduces the residence time in the reactor required to achieve a given degree of reduction and thereby increases the production of the reactor. Other objects of the invention will be in part obvious and in part pointed out hereinafter.

The objects and advantages of the present invention may best be understood and appreciated by reference to the accompanying drawings which illustrate apparatus incorporating a preferred embodiment and a modification of the apparatus invention and capable of being used to carry out the method of the invention.

In the drawings:

FIG. 1 illustrates diagrammatically a sponge iron reduction system wherein hot reducing gas is fed in two separate streams to the top and bottom of the reduction zone of the reactor to produce convergent gas streams that flow downwardly and upwardly, respectively, through the ore body being reduced and are moved at a point near the center of the reduction zone; and, FIG. 2 shows a generally similar system wherein a reducing gas stream is fed to a point near the center of the reduction zone to produce divergent flow of the reducing gas in the upper and lower portions of the reduction zone.

Referring to the drawings, in which like reference characters are used to designate similar components in the two Figures, and particularly referring to FIG. 1, the numeral 10 generally designates a vertical shaft reactor having a reduction zone 12 in the upper portion thereof and a cooling zone 14 in the lower portion thereof. The reactor 10 is suitably heat insulated and is interiorly lined with a refractory material in a manner known in the art. Particulate ore to be treated is introduced into the reactor 10 through a charging pipe 16. The ore to be charged may be in the form of lumps or pre-formed pellets. It flows downwardly through the reduction zone wherein it is largely reduced to sponge iron in a manner described below, then through cooling zone 14 wherein it is cooled by cooling gas flowing therethrough and leaves the reactor through the outlet pipe 18.

At the junction of the reduction and cooling zones there is an internal frusto-conical baffle 20 which guides the downwardly flowing ore particles to a conduit 22 leading to the cooling zone 14. The baffle 20 extends through the wall of the reactor and forms part of an annular plenum chamber 24 extending around the periphery of the reactor and providing a means whereby reducing gas may be fed to or removed from the reactor. Near the center of the reduction zone 12 there is a second plenum chamber 25 similar to the plenum chamber 24.

Near the bottom of reactor 10 there is a frustoconical baffle 26 which together with the reactor wall defines an annular space 28 through which cooling gas may be introduced into the reactor to flow through the body of reduced ore particles in cooling zone 14. If desired, the reactor 10 may be operated at an elevated pressure, in which event, the ore is fed at the top of the reactor and the sponge iron removed from the bottom of the reactor by using suitable feed and discharge apparatus adapted to maintain the desired pressure in the reactor.

Referring to the left-hand portion of FIG. 1, reducing gas is typically generated in a reformer 30 of a known type. In the embodiment of the reformer shown in FIG. 1, natural gas and steam are pre-heated by being passed through the coils in the stack portion 32 of the reformer and a mixture of the pre-heated natural gas and steam are caused to flow through a heated catalyst bed in the lower portion 34 of the reformer wherein they are converted to a gas mixture consisting largely of carbon monoxide, hydrogen and water vapor. The gas mixture then flows through a pipe 36 to a quench cooler 38 wherein the gas is quenched to remove most of the water vapor therefrom. Upon leaving cooler 38 the gas flows through a pipe 40 containing a flow controller 42 which operates to establish and maintain a predetermined flow of reducing gas to the reducing gas system now to be described.

The fresh reducing gas going through pipe 40 is combined with recycled gas in a manner described below and divided into two streams, one of which flows through branch pipe 44 containing flow controller 46 and the other of which flows through branch pipe 48 containing flow controller 50. The two gas streams are heated in a coil heater 52 to a temperature of the order of 700° to 850°C. More particularly, the reducing gas flowing through branch pipe 44 passes through the heating coil 54 of heater 52 and the gas flowing through branch pipe 48 flows through the heating coil 56 of heater 52. From the outlet of coil 54 the heated gas flows through pipe 58 to a combustion chamber 60 and thence to the plenum chamber 24 at the bottom of reduction zone 12 of the reactor.

The function of the combustion chamber 60 is to further increase the temperature of the reducing gas before it enters the reactor. Since the reducing gas temperature as the gas enters the reactor should desirably be of the order of 900° to 1,000°C., i.e., substantially above the temperature of the gas leaving coil heater 52, the gas temperature is further increased at a point near the reactor by causing it to pass through chamber 60 to which a relatively small amount of air or oxygen is added through the pipe 61. The added air or oxygen causes a small amount of the reducing gas to be burned to raise the temperature of the mixture to the desired value. Especially in cases where air is used as the oxidant, the oxidant gas is desirably preheated to approximately the temperature of the reducing gas with which it is mixed. Such preheating can be effected, for example, in a coil heater such as the coil heater 52. The combustion chamber 60 may be of the type disclosed in U. S. Pat. No. 2,900,247.

Heated reducing gas leaving the coil 56 of heater 52 flows through a pipe 62 to a combustion chamber 63, which is similar to the combustion chamber 60, and enters the reactor at a point near the top of reduction zone 12. As in the case of the gas fed through pipe 58, the gas flowing through pipe 62 is mixed in combustion chamber 63 with a small amount of air or oxygen supplied through pipe 64 and the admixed air or oxygen burns a small amount of the reducing gas to raise the temperature of the gas fed to the reactor to the desired value, i.e., a temperature of the order of 900° to 1,000°C.

The gas stream entering the reactor through plenum chamber 24 flows upwardly through the ore body in the lower portion of the reduction zone 12 and the gas fed to the reactor through pipe 62 flows downwardly through the upper portion of the ore body in reduction zone 12. Near the center of the reduction zone 12 the two gas streams are combined and flow out of the reactor through plenum chamber 25 and a pipe 66 to a quench cooler 68 wherein the mixed gas is cooled to remove water vapor therefrom. From the top of cooler 68 the gas flows through pipe 70 to the suction side of a pump 72 which pumps the gas through a pipe 74 to branch pipes 44 and 48 for recycling through the heater 52.

It is evident that in the system shown in FIG. 1 the reducing gas flows in two interconnected loops. The upper loop wherein the gas flows in a generally clockwise direction includes the upper section of reduction zone 12, plenum chamber 25, pipe 66, cooler 68, pipe 70, pump 72, pipes 74 and 48, coil 56 of heater 52, pipe 62 and combustion chamber 63. The lower loop in which the reducing gas flows in a generally counterclockwise direction includes the lower section of reduction zone 12, plenum chamber 25, pipe 66, cooler 68, pipe 70, pump 72, pipes 74 and 44, coil 54 of heater 52, pipe 58, combustion chamber 60 and plenum chamber 24. The distribution of gas between the two loops is determined by the settings of flow controllers 46 and 50 which are usually set to cause equal flows of gas to pass through the two loops.

The reducing gas entering the top of the reactor through pipe 62 is relatively rich in reducing constituents and has a high temperature, both of which factors faborably favorably the chemical reaction rate between the gas and ore and thus an exceptionally high rate of reduction is achieved in the upper portion of the reduction zone. The gas supplied through pipe 58 and plenum chamber 24 to the bottom of reduction zone 12 comes in contact with ore that has been largely reduced to sponge iron. As pointed out above, in the case of largely reduced ore the rate of diffusion of gas into the iron-bearing particles is the dominant factor in overall reaction rate. Since the gas entering the reactor through plenum chamber 24 is relatively rich in hydrogen, the conditions in the lower portion of the reduction zone also favor a relatively high overall reduction rate. Thus by using a split-flow system of this type the average overall reduction rate in the reduction zone is substantially increased. As a result, a given degree of reduction can be achieved with a shorter residence time of the iron-bearing material in the reactor and the productivity of the reactor thereby increased.

As has been described above, fresh reduction gas is introduced into the gas recycle portion of the system through pipe 40 at a rate controlled by the flow controller 42. In order to maintain the reducing gas content of the gas recycle portion of the system substantially constant, spent reducing gas is removed from the suction side of pump 72 through a pipe 82 containing a check valve 84. The vent gas may flow either through a pipe 86 containing a valve 88 to a combustible fuel storage tank or through a pipe 90 to a vent stack 92. The pipe 90 contains a pressure controller 94 which maintains a suitable back pressure in pipe 82 and hence in the gas recycle portion of the system.

As indicated above, the reduced ore is cooled by a cooling gas in the cooling zone 14 of the reactor. Referring to the lower left-hand portion oof FIG. 1, cooling gas enters the system through a pipe 96 provided with an automatic flow controller 98. A wide variety of cooling gases may be used, including hydrogen, carbon monoxide, mixtures thereof, methane or other hydrocarbon gas, carbon dioxide or nitrogen. The choice of a cooling gas depends upon such factors as whether it is desired to carburize, as well as cool the sponge iron and whether the spent cooling gas is to be later used as a fuel gas or in some part of the reducing gas system.

The cooling gas entering the cooling gas system flows through pipe 96 to a pump 100 and thence through a pipe 102 containing a flow controller 104 to the annular space 28 in reactor 10. The cooling gas flows upwardly through the cooling zone 14 to an annular space 106 defined by baffle 20, conduit 22 and the wall of the reactor. As indicated above, carburization of the sponge iron can be effected in cooling zone 14 by using a carbon-containing cooling gas that is cracked in contact with the hot sponge iron to deposit carbon thereon.

At the top of the cooling zone the cooling gas leaves the reactor and more particularly chamber 106 thereof through a pipe 108 and flows through a conventional dust collector 110 and pipe 112 to a quench cooler 114. From cooler 114 the gas is recycled through pipe 116 and pipe 118 containing valve 119 to the pipe 96 and the suction side of pump 100.

As previously described, cooling gas is supplied to the cooling gas system through the pipe 96. In order to maintain tbe volume of cooling gas substantially constant, a portion of the cooling gas flowing through the cooling gas loop is vented through a pipe 120 connected to pipe 116 near the outlet of cooler 114. The gas vented through pipe 120 flows to the spent reducing gas portion of the system shown near the top of FIG. 1, and more particularly, to pipe 82 through which it may flow either to vent stack 92 or the combustible fuel storage as previously described. Referring to the lower right portion of FIG. 1, a pressure controller 122 is provided in pipe 120 to maintain a suitable desired back pressure in the cooling gas system.

Since it is usually necessary to use gases having different compositions in the reducing zone 12 and cooling zone 14 of the reactor, it is desirable to provide means for preventing the intermingling of the gases between these two zones. Apparatus for at least minimizing such commingling of the reducing and cooling gases will now be described. Referring to the right-hand portion of FIG. 1, a differential pressure controller 124 is provided which is made responsive through a pipe 126 to the pressure in plenum chamber 24 (designated P-1) and through a pipe 128 to the pressure in the annular space 106 (designated P-2). The differential pressure controller 124 establishes a signal, e.g., a pneumatic pressure which is a function of the difference between the pressures of P-1 and P-2, and this signal is used to adjust the setting of pressure controller 122 in pipe 120 and thereby regulate the back pressure in the cooling gas system in such manner as to make pressure P-2 substantially equal to pressure P-1. Thus the interior of conduit 22 becomes a substantially isobaric zone and commingling of the cooling gas and reducing gas is minimized.

It is further desirable, although not essential, that the pressure P-1 be maintaned constant and that the flow through pipe 120 be adjusted to bring the pressure P-2 to a value equal to P-1. To this end an automatic pressure controller 130 is made responsive to the pressure P-1 through a pipe 132 and the output of controller 130 is conducted through pipe 134 to the pressure controller 94 to adjust the set point of the latter controller in such manner that the spent reducing gas is vented at a rate such as to maintain the pressure P-1 substantially constant. It has been found that by maintaining the pressure P-1 constant in this manner, the pressure within conduit 22 can be maintained more nearly isobaric.

Referring now to FIG. 2 of the drawings, the system there shown is generally similar to that of FIG. 1 in that it shows a system wherein a split-flow of the reducing gas in the reduction zone of the reactor is used. However, in the system of FIG. 2 all of the reducing gas is fed to a point near the center of the reduction zone and then caused to flow both upwardly and downwardly in the reduction zone to produce a divergent flow of the reducing gas therein. In view of the similarities between FIGS. 1 and 2, only the differences between the two systems will be described in connection with FIG. 2.

As in the system of FIG. 1, reducing gas generated in the gas reformer 30 flows through quench cooler 38 and pipe through piep 40 to the gas recycle portion of the reduction system. More particularly, pipe 40 is connected to a pipe 200 wherein the fresh reducing gas is mixed with recycled gas as described below. The mixed gas is heated in a coil heater 202 to a temperature of the order of 700° to 850° C. and then flows through a combustion chamber 204 to plenum chamber 25 and thence into the central portion of reduction zone 12. As described in connection with FIG. 1, the temperature of the reducing gas fed to the ore body in the reduction zone is desirably of the order of 900° to 1,000° C. Accordingly, the combustion chamber 204 is interposed between the heater 202 and the reactor. A small amount of air or oxygen is fed through pipe 206 to the reducing gas in chamber 204 to burn a portion thereof to achieve the desired relatively high temperature for reduction of the ore.

The reducing gas entering the reduction zone through plenum chamber 25 flows both upwardly and downwardly through the body of ore in the reduction zone. the upwardly flowing stream of reducing gas is removed from the reactor through a pipe 208 containing a flow controller 210 that maintains the gas flow through this portion of the system at a desired predetermined value. Upstream of flow controller 210 water is fed through a branch pipe 212 containing a regulating valve 214 in order to reduce the gas temperature and thereby avoid damage to the portions of controller 210 through which the gas flows.

The portion of reducing gas that flows downwardly through the lower portion of reduction zone 12 to removed from the reactor through plenum chamber 24 and a pipe 216 containing a flow controller 218 that maintains the gas flow through this portion of the system at a predetermined desired value. Upstream of flow controller 218 water is supplied through a pipe 220 containing a regulating valve 222 to the pipe 216 to reduce the gas temperature and thereby avoid damage to the portions of controller 218 through which the hot reducing gas flows.

The regulated gas stream flowing through pipes 208 and 216 are combined in a pipe 224 and conducted thereby to a quench cooler 226 wherein water vapor is removed from the gas mixture. From cooler 226 the mixed gas flows through pipe 228 to the suction side of a pump 230, the discharge side of which is connected by pipe 200 to the heater 202. As pointed out above, the incoming fresh reducing gas from pipe 40 is mixed with the recycled gas in pipe 200.

It is evident that the system shown in FIG. 2, like that shown in FIG. 1, comprises two interconnected reducing gas loops. The upper loop wherein the gas flows in a generally counterclockwise direction includes the upper section of reduction zone 12, pipes 208 and 224, cooler 226, pipe 228, pump 230, pipe 200, heater 202, combustion chamber 204 and plenum chamber 25. The lower loop in which the reducing gas flows in a generally clockwise direction includes the lower section of reduction zone 12, plenum chamber 24, pipes 216 and 224, cooler 226, pipe 228, pump 230, pipe 200, heater 202, combustion chamber 204 and plenum chamber 25.

As has been described above, fresh reducing gas is introduced into the gas recycle portion of the system of FIG. 2 through a pipe 40 at a rate controlled by the flow controller 42. In order to maintain the quantity of reducing gas approximately constant in the gas recycle portion of the system, spent gas is removed from the suction side of pump 230 through pipe 82 containing the check valve 84. As in the case of the system of FIG. 1, the spent reducing gas may go either to combustible fuel storage or may be vented through a vent stack 92.

As indicated above, the flow system of FIG. 1 is generally preferable to that of FIG. 2 since it produces gas temperatures and gas qualities in the different portions of the reduction zone that tend to maximize the overall reduction rate in both the upper and lower portions of the reduction zone. On the other hand, with the system of FIG. 2, the gas temperature and quality, while not so favorable as in the system of FIG. 1, are still sufficiently favorable so that a greater average overall reduction rate, and consequently greater productivity, is obtained than would be obtained by using either counter-current or co-current flow throughout the reduction zone of a reactor. Moreover, the system of FIG. 2 provides certain advantages over that of FIG. 1 in respects other than reduction rate.

Referring to FIG. 1, it will be noted that the entire volume of circulating gas leaves the reactor through plenum chamber 25. In the design and operation of commercial plants, especially where the ore being treated contains a substantial proportion of small particles, the transport of particles out of the reactor caused by high gas velocities at an outlet plenum can present a problem. In th system of FIG. 2 this problem is avoided since the higher gas velocity plenum is an inlet plenum. Also the system of FIG. 2 only requires one combustion chamber (204) as compared with the two combustion chambers (60, 63) of the system of FIG. 1.

It is, of course, to be understood that the methods and apparatus described above in connection with FIGS. 1 and 2 are intended to be illustrative only and that numerous changes can be made therein within the scope of the invention. For example, referring to FIG. 1, if independent temperature control of the two gas streams is desired, the gas flowing through pipes 44 and 48 can be heated in separate coil heaters rather than in separate coils of the same heater 52. Also the gas discharged by pump 72 can be supplied to a coil heater 52 having a single heating coil therein and the heated gas from the heater can thereafter be divided into two streams which have separately regulated flow rates and which are supplied to the top and bottom of the reduction zone of the reactor. However, this latter modification is subject to the disadvantage that any flow regulating means used to regulate the gas streams is exposed to the relatively high temperature of the gas leaving the heater and may be adversely affected thereby. Thus the system of FIG. 1 wherein the flow rates of the separate gas streams are regulated while the gas is at a relatively low temperature is usually preferable.

As pointed out at the beginning of the specification, the present method and apparatus can be used in the reduction of ores other than iron ore, for example, ores of metals such as nickel, copper, tin, titanium, barium and calcium.

Other modifications within the scope of the invention as defined by the appended claims will be apparent to those skilled in the art.

We claim:

1. The method of reducing a particulate metal ore to metal particles in a vertical shaft, moving bed reactor having a reduction zone in which a hot reducing gas is caused to flow through a portion of said bed to reduce the metal ore thereof to metal, which comprises supplying a first stream of hot reducing gas to said reactor near the top of said reduction zone and causing all of said gas of said first stream to flow downwardly through said bed, supplying a second stream of hot reducing gas to said reactor near the bottom of said reduction zone and causing substantially all of said gas of said second stream to flow upwardly through said bed, combining said first and second gas streams to form a third stream that is withdrawn from said reactor near the middle of said reduction zone, cooling said third stream to remove water therefrom, recirculating a predetermined portion of said third stream as said first stream to the top of said reduction zone, heating said first stream before it enters said reactor, recirculating the remainder of said third stream as said second stream to the bottom of said reduction zone, heating said second stream before it enters said reactor, whereby said first stream, the gas flowing downwardly through said reduction zone and said third stream form a first closed loop, and said second stream, the gas flowing upwardly through said reduction zone and said third stream form a second closed loop, supplying to said third stream from a source external of said loops a regulated amount of a preformed reducing gas consisting largely of carbon monoxide and hydrogen, and venting spent reducing gas from said third stream at a point between said reducing zone and the point at which said preformed reducing gas is added to said third stream.

2. A method according to claim 1 wherein the gas flow rates of said first and second streams are maintained substantially equal.

3. A method according to claim 1 wherein said metal ore is iron ore and said metal particles are sponge iron particles.

4. The method of reducing a particulate metal ore to metal particles in a vertical shaft, moving bed reactor having a reduction zone in which a hot reducing gas is caused to flow through a portion of said bed to reduce the metal ore thereof to metal and having a cooling zone for cooling the reduced metal, which comprises supplying a first stream of hot reducing gas to said reactor near the top of said reducing zone and causing all of said gas of said first stream to flow downwardly through said bed, supplying a second stream of hot reducing gas to said reactor near the bottom of said reducing zone and causing substantially all of said gas of said second stream to flow upwardly through said bed, combining said gas streams to form a third stream that is withdrawn from said reactor near the middle of said reduction zone, recirculating a predetermined portion of said third stream as said first stream to form a first closed loop comprising said first and third streams and the portion of said reduction zone through which said first stream flows, recirculating the remainder of said third stream as said second stream to form a second closed loop comprising said second and third streams and the portion of said reduction zone through which said second stream flows, supplying to said third stream from a source external of said loops a preformed make-up gas consisting largely of carbon monoxide and hhdrogen, and continuously venting spent reducing gas from said third stream, supplying a fourth stream of a cooling gas to a point near the lower end of the cooling zone of said reactor and causing it to flow upwardly through said cooling zone, removing said cooling gas from a point near the top of said cooling zone as a fifth stream, cooling said fifth stream externally of said reactor, combining it with said fourth stream to form a closed cooling gas loop, and removing the cooled sponge iron from the reactor.

5. A method according to claim 4 wherein cooling gas from an external source is continuously supplied to said cooling loop and cooling gas is continuously vented from said cooling loop.

6. The method of reducing a particulate metal ore to metal particles in a vertical shaft, moving bed reactor having a reduction zone in which a hot reducing gas is caused to flow through a portion of said bed to reduce the metal ore thereof to metal which comprises supplying a first stream of hot reducing gas to said reactor near the center of said reducing zone and causing portions thereof to flow both upwardly and downwardly through the ore bed in said reduction zone, removing all of the upwardly flowing reducing gas near the top of said reduction zone as a second stream, removing substantially all of the downwardly flowing reducing gas near the botton of said reduction zone as a third stream, combining said second and third streams to form a fourth stream, cooling said fourth stream to remove water therefrom, and thereafter heating said fourth stream to form said first stream, whereby the portion of said first stream flowing upwardly through said reduction zone, and second stream, said fourth stream and said first stream form a first closed loop, and the portion of said first stream flowing downwardly through said reduction zone, said third stream, said fourth stream and said first stream form a second closed loop, supplying to said fourth stream from a source external of said loops a regulated amount of a preformed reducing gas consisting largely of carbon monoxide and hydrogen, and venting spent reducing gas from said fourth stream.

7. A method according to claim 6 wherein the flow rates of said second and third gas streams are separately regulated before being combined to form said fourth stream.

8. A method according to claim 7 wherein the reducing gas flowing through each of said second and third streams is cooled by addition of water thereto between the point at which it leaves the reactor and the point at which its flow rate is regulated.

9. A method according to claim 6 wherein said metal ore is iron ore and said metal particles are sponge iron particles.

10. The method of reducing a particulate metal ore to metal particles in a vertical shaft, moving bed reactor having a reduction zone in which a hot reducing gas is caused to flow through a portion of said bed to reduce the metal ore thereof to metal and having a cooling zone for cooling the reduced metal, which comprises supplying a first stream of hot reducing gas to said reactor near the center of said reducing zone and causing portions thereof to flow both upwardly and downwardly through the ore bed in said reduction zone, removing all of the upwardly flowing reducing gas near the top of said reduction zone as a second stream, removing substantially all of the downwardly flowing reducing gas near the botton of said reduction zone as a third stream, combining said second and third streams externally of said reactor to form a fourth stream, cooling said fourth stream to remove water therefrom, thereafter heating said fourth stream to form said first stream, continuously supplying a preformed reducing gas consisting largely of carbon monoxide and hydrogen to said fourth stream and continuously venting spent reducing gas from said fourth stream, supplying a fifth stream of a cooling gas to a point near the lower end of the cooling zone of said reactor and causing it to flow upwardly through said cooling zone, removing said cooling gas from a point near the top of said cooling zone as a sixth stream, cooling said sixth stream externally of said reactor, combining it with said fifth stream to form a closed cooling gas loop, and removing the cooled sponge iron from the reactor.

11. A method according to claim 10 wherein cooling gas from an external source is continuously supplied to said cooling loop and cooling gas is continuously vented from said cooling loop.

* * * * *

UNITED STATES PATENT OFFICE
CERTIFICATE OF CORRECTION

Patent No. 3,779,741          Dated December 18, 1973

Inventor(s) Juan Celada et al.

It is certified that error appears in the above-identified patent and that said Letters Patent are hereby corrected as shown below:

Claim 1 "reducting" should be --reducing--; (line 41)

Claim 4 (line 39) "hhdrogen" should be --hydrogen--;

Claim 10 (line 40) "saId" should be --said--;

Signed and sealed this 15th day of October 1974.

(SEAL)
Attest:

McCOY M. GIBSON JR.
Attesting Officer

C. MARSHALL DANN
Commissioner of Patents